June 21, 1932.  H. F. TAYLOR  1,864,284

STEAK AND METHOD OF PRODUCING SAME

Original Filed July 1, 1929

INVENTOR
Harden F. Taylor
BY Wm. S. Pritchard
ATTORNEY

Patented June 21, 1932

1,864,284

UNITED STATES PATENT OFFICE

HARDEN F. TAYLOR, OF SCARSDALE, NEW YORK, ASSIGNOR TO THE ATLANTIC COAST FISHERIES COMPANY, OF NEW YORK, N. Y., A CORPORATION OF MAINE

STEAK AND METHOD OF PRODUCING SAME

Application filed July 1, 1929, Serial No. 375,165. Renewed November 19, 1931.

This invention relates to comestibles and more particularly to steaks or cuts transverse of the "grain" or muscle fibers of meat and to the method of producing the same.

In my copending application, Serial No. 343,569, filed February 28, 1929, there are disclosed steaks and a method of producing the same. The steaks comprise a plurality of cross-cut pieces of fish or other comestibles having a band of material therearound to hold the pieces together. One of the methods of producing said steaks consisted in forming a substantially cylindrical mass of fish, enveloping said mass in a tube of paper or the like, cutting the filled tube transversely thereof in any desired thickness and freezing the severed portions. Specifically this method consisted in forming a trough of parchment paper by raising the two edges with respect to the middle. In this paper trough skinned and boned pieces of fish, such as fillets, were placed preferably longitudinally of the trough and parallel to one another. The upper edges of the trough were gradually bent or folded to form a tube. To secure the portions adjacent the edges to form a continuous tube the overlapping portions were glued, stapled, stitched or otherwise fastened. Subsequently the mass was cut transversely thereof to form steaks of any predetermined thickness.

I have found that I can produce steaks of the type above-described without the aid of adhesives, staples, stitches or the like in the formation of the tube. This is attained by forming a predetermined shaped mass of meat, spirally wrapping said mass with a tape or ribbon, preferably with the successive convolutions overlapping, cutting said wrapped mass transversely thereof and freezing the severed portions. As will be more fully explained, the freezing operation may be carried out prior to the cutting into individual steaks.

It is therefore an object of this invention to provide a method of forming frozen steaks on a plurality of cross-cut pieces of meat having a band therearound, said band having no positive means such as adhesives, staples, stitches, or the like for securing it.

Another object of this invention is to provide a method of forming frozen steaks which comprises forming a predetermined shaped mass of a comestible such as fish, spirally wrapping said mass with a ribbon or tape of any suitable material and preferably in such a manner that the successive convolutions thereof overlap.

An additional object of this invention is to provide a frozen steak formed of a plurality of cross-cut pieces of meat having a band resulting from the transverse cutting of a spirally wound tape of overlapping convolutions.

A further object of this invention is to provide a food product comprising a frozen steak formed of a plurality of cross-cut pieces of fish having a band resulting from the transverse cutting and preferably at right angles to the axis of a spirally wound band having its successive convolutions overlapping.

Other objects will appear from the following description, appended claims and accompanying drawing in which:

Figure 1 designates a cylindrical mass of a plurality of fillets of fish or other meat spirally wrapped ready for cutting.

Figure 1:
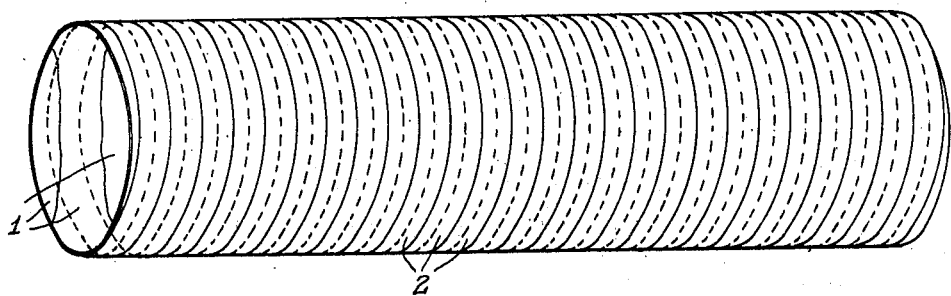
Figure 2:
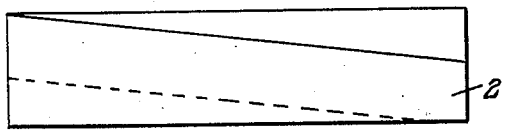
Figure 2 is a front elevation of a steak showing one modification of the band thereof.
Figure 3:
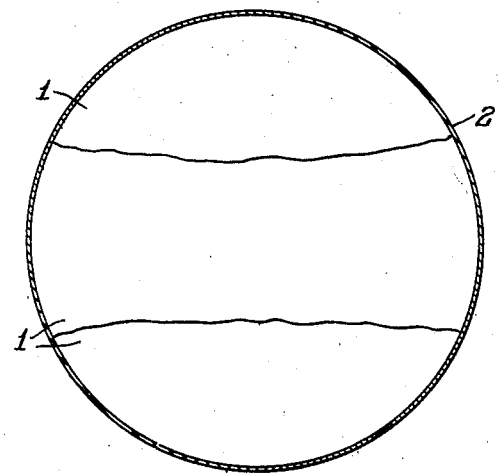
Figure 3 is a top plan view of the steak.

Referring to the drawing wherein like reference numerals designate like parts, the reference numeral 1 designates a plurality of pieces of a comestible comprising a steak and formed in a predetermined shape. In Figure 1 the mass is substantially cylindrical in shape but the invention is not limited thereto since any other shape may be used. Though the following description refers specifically to fish, it is to be understood that the invention is not restricted thereto since it is applicable to meats of all kinds. The cylindrical mass is produced by arranging the fish, preferably in the form of fillets, longitudinally with the muscle fibers parallel to one another in a suitable device such as a mold or semi-cylindrical trough. In the formation of the mass the adherence of the fillets to one another may be improved by treating them prior to the formation of said mass with a mild alkaline brine such as described in my copending application, Serial No. 276,493. The adherence of the fillets to one another may also be improved by permitting or causing them to dry slightly. This causes the natural moisture on the surface which contains proteinaceous and gluey compounds to become thick and tacky.

After the fillets have been arranged and formed in the cylindrical mass as described, it is forced from the shaping device. As the mass issues and at the point of exit therefrom it is wrapped with a tape or ribbon 2 of any suitable material. Preferably, the mass is spirally wrapped, the successive turns or convolutions of the wrapping overlapping as clearly indicated in the drawing. In practice I have found that a ribbon of approximately one or two inches wide forms a substantially snug retaining means and especially if the successive turns or convolutions overlap by approximately one-half of the width of the ribbon. This wrapped mass is then cut transversely preferably at right angles to the axis of the mass by means of a knife. By forming the mass of a predetermined diameter and cutting it in a predetermined thickness, steaks of predetermined weight may be obtained.

These steaks lend themselves very easily to wrapping and packing in bulk. They may be and preferably are frozen prior to wrapping and packing, the freezing thereof serving to preserve the product and also to fix the shape and cohesiveness of the composite steak in a permanent unitary structure, the shape of which is retained even after defrosting or thawing.

Various materials can be used to form the spiral wrapping or band. Satisfactory results have been obtained when tapes of paper, parchment paper, regenerated cellulose, fabrics, and the like are used.

Paper and many other materials stretch slightly when wet. Accordingly, if the wrapping is applied in its dry normal state and it becomes wet, it will stretch slightly causing a looseness in the final band. To overcome this, the tape is moistened or wetted at some stage of the process. The wetting operation permits the wrapping material to be slightly stretched and form a snug wrapping. It also increases the traction and friction of the wrapping material whereby loosening and slipping of the band is prevented.

Instead of cutting the wrapped shaped mass to form the steaks as above described, it may be cut in lengths from one to five feet, forming bodies of definite lengths. These bodies, preferably cylindrically shaped, are frozen and subsequently sawed or cut either in the frozen or defrosted state to form steaks. Instead of cutting the wrapped mass in definite lengths the meat may be formed in cylinders of definite lengths and spirally wrapped as above described. Subsequently the cylinders of meat may be frozen and finally cut or sawed into any desired thicknesses, while in the frozen state or after defrosting, as previously mentioned.

From the above it is apparent that the spiral wrap gives a substantially tight band and satisfactorily holds together the composite pieces of fish without the use of adhesives, staples and the like.

I claim:

1. A method of producing steaks, which comprises forming a predetermined shaped mass of meat, spirally wrapping said mass, cutting said wrapped mass transversely thereof and freezing the severed portions.

2. A method of producing steaks which comprises forming a substantially cylindrical mass of meat, spirally wrapping said mass, cutting said wrapped mass transversely thereof and freezing the severed portions.

3. A method of producing steaks which comprises forming a predetermined shaped mass of fish meat, spirally wrapping said mass, the successive convolutions overlapping, cutting said mass transversely thereof and freezing the severed portions 4. A method of producing steaks which comprises forming a substantially cylindrical mass of fish meat, spirally wrapping said mass, the successive convolutions overlapping, cutting said mass transversely thereof and freezing the severed portions.

5. A method of producing steaks which comprises forming a plurality of fish fillets in a substantially cylindrical mass, spirally wrapping said mass with a tape of parchment paper, cutting said mass transversely thereof and freezing the severed portions.

6. A method of producing steaks which comprises forming a plurality of fish fillets in a predetermined shaped mass, spirally wrapping said mass with a tape of parchment paper, the convolutions of said wrap overlapping, cutting said mass transversely thereof and freezing the severed portions.

7. A method of producing steaks which comprises forming a plurality of fish fillets in a substantially cylindrical mass, spirally wrapping said mass with a tape of parchment paper, the convolutions of said wrap overlapping, cutting said mass transversely thereof and freezing the severed portions.

8. A process of producing steaks which comprises forming a predetermined mass of meat, spirally wrapping said mass with a tape of parchment paper wetted at some stage of the process, the successive convolutions of the wrap overlapping, cutting said mass transversely thereof and freezing the severed portions.

9. A process of producing steaks which comprises arranging a plurality of fish fillets to form a substantially cylindrical mass, spirally wrapping said mass with a tape of parchment paper wetted at some stage of the process, the successive convolutions of the wrap overlapping, cutting said mass transversely thereof and freezing the severed portions.

10. A process of producing steaks which comprises forming a predetermined mass of meat, spirally wrapping said mass with a tape of parchment paper wetted at some stage of the process, freezing said wrapped mass and cutting said mass transversely thereof.

11. A process of producing steaks which comprises arranging a plurality of fish fillets to form a substantially cylindrical mass, spirally wrapping said mass with a tape of parchment paper wetted at some stage of the process, freezing said mass, and cutting said mass transversely thereof.

12. A method of producing steaks, which comprises improving the adhesiveness of meat, forming a predetermined shaped mass of said meat, spirally wrapping said mass with a tape, the convolutions thereof overlapping, cutting said mass transversely thereof and freezing the severed portions.

13. A method of producing steaks which comprises improving the adhesiveness of fish meat, forming a predetermined shaped mass of said fish meat, spirally wrapping said mass with a tape, the convolutions thereof overlapping, cutting said mass transversely thereof and freezing the severed portions.

14. A food product comprising a frozen steak formed of a plurality of cross-cut pieces of meat having a band therearound resulting from the transverse cutting of a spirally wound tape of overlapping convolutions.

15. A food product comprising a frozen steak formed of a plurality of cross-cut pieces of fish meat having a band therearound resulting from the transverse cutting of a spirally wound tape of overlapping convolutions.

16. A food product comprising a frozen steak formed of a plurality of cross-cut pieces of fresh meat having a band therearound resulting from the transverse cutting of a spirally wound tape of overlapping convolutions.

17. A food product comprising a frozen steak formed of a plurality of cross-cut pieces of fresh fish meat having a band therearound resulting from the transverse cutting of a spirally wound tape of overlapping convolutions.

18. A process of producing steaks which comprises forming a predetermined mass of meat, spirally wrapping said mass, the successive convolutions of the wrap overlapping, freezing said wrapped mass and cutting said mass transversely thereof.

19. A process of producing steaks which comprises arranging a plurality of fish fillets to form a substantially cylindrical mass, spirally wrapping said mass, the successive convolutions of the wrap overlapping, freezing said mass and cutting said mass transversely thereof.

In testimony whereof, I have affixed my signature to this specification.

HARDEN F. TAYLOR.